United States Patent
Piede et al.

(10) Patent No.: US 7,113,676 B2
(45) Date of Patent: Sep. 26, 2006

(54) PLANAR WAVEGUIDE OPTICAL ISOLATOR IN THIN SILICON-ON-ISOLATOR (SOI) STRUCTURE

(76) Inventors: David Piede, 11 Jade La., Allentown, PA (US) 18104; Margaret Ghiron, 1875 Sherwood Rd., Allentown, PA (US) 18103; Prakash Gothoskar, 6749 Windermere Ct., Allentown, PA (US) 18104; Robert Keith Montgomery, 810 Howe St., Easton, PA (US) 18040; Vipulkumar Patel, 607 Falcongate Dr., Monmouth Junction, NJ (US) 08852; Kalpendu Shastri, 5529 Willow Way, Orefield, PA (US) 18069; Soham Pathak, 6099 Palomino Dr., Allentown, PA (US) 18106; Katherine A. Yanushefski, 7487 Stein Rd., Zionsville, PA (US) 18092; Harvey Wagner, 238 Old Mill Rd., Macungie, PA (US) 18062

( * ) Notice: Subject to any disclaimer, the term of this patent is extended or adjusted under 35 U.S.C. 154(b) by 0 days.

(21) Appl. No.: 11/005,286

(22) Filed: Dec. 6, 2004

(65) Prior Publication Data
US 2005/0123232 A1 Jun. 9, 2005

Related U.S. Application Data

(60) Provisional application No. 60/526,801, filed on Dec. 4, 2003.

(51) Int. Cl.
*G02B 6/26* (2006.01)
*G02B 6/42* (2006.01)

(52) U.S. Cl. .............................. 385/42; 385/31; 385/37; 385/39; 385/43; 385/45; 385/47; 385/50

(58) Field of Classification Search .................. 385/42
See application file for complete search history.

(56) References Cited

U.S. PATENT DOCUMENTS

| 5,359,682 | A | | 10/1994 | Caldera et al. |
| 5,463,705 | A | * | 10/1995 | Clauberg et al. ............... 385/14 |
| 5,539,571 | A | * | 7/1996 | Welch et al. ................ 359/344 |
| 5,764,681 | A | * | 6/1998 | Ballantyne et al. ........... 372/94 |
| 5,822,480 | A | | 10/1998 | Jeong et al. |
| 6,456,764 | B1 | | 9/2002 | Okayama |
| 6,535,656 | B1 | | 3/2003 | Noge et al. |

(Continued)

Primary Examiner—Frank G. Font
Assistant Examiner—Ryan Lepisto
(74) Attorney, Agent, or Firm—Wendy W. Koba

(57) ABSTRACT

A planar optical isolator is formed within the silicon surface layer of an SOI structure. A forward-directed signal is applied to an input waveguiding section of the isolator and thereafter propagates through a non-reciprocal waveguide coupling region into an output waveguide section. A rearward-directed signal enters via the output waveguide section and is thereafter coupled into the non-reciprocal waveguide structure, where the geometry of the structure functions to couple only a small amount of the reflected signal into the input waveguide section. In one embodiment, the non-reciprocal structure comprises an N-way directional coupler (with one output waveguide, one input waveguide and N–1 isolating waveguides). In another embodiment, the non-reciprocal structure comprises a waveguide expansion region including a tapered, mode-matching portion coupled to the output waveguide and an enlarged, non-mode matching portion coupled to the input waveguide such that a majority of a reflected signal will be mismatched with respect to the input waveguide section. By cascading a number of such planar SOI-based structures, increased isolation can be achieved—advantageously within a monolithic arrangement.

23 Claims, 11 Drawing Sheets

U.S. PATENT DOCUMENTS

| | | |
|---|---|---|
| 6,690,178 B1 | 2/2004 | Harris et al. |
| 6,707,968 B1 | 3/2004 | Masuda et al. |
| 6,798,952 B1 | 9/2004 | Naruse |
| 6,885,795 B1 * | 4/2005 | Hsu et al. ............... 385/48 |
| 2002/0172464 A1 * | 11/2002 | Delwala ............... 385/40 |
| 2003/0128905 A1 | 7/2003 | Kambe et al. |
| 2003/0153161 A1 * | 8/2003 | Chu et al. ............... 438/455 |
| 2004/0105476 A1 | 6/2004 | Wasserbauer |
| 2004/0151423 A1 | 8/2004 | Izhaky et al. |

* cited by examiner

NOTE: Φ < 50°

NOTE: Φ < 50°

FORWARD LIGHT PROPAGATION 3 dB ATTENUATION OF BACK-SCATTERED DUE Y-SPLITTERS

PLANAR WAVEGUIDE OPTICAL ISOLATOR IN THIN SILICON-ON-ISOLATOR (SOI) STRUCTURE

CROSS-REFERENCE TO RELATED APPLICATION

This application claims the benefit of Provisional Application No. 60/526,801, filed Dec. 4, 2003.

TECHNICAL FIELD

The present invention relates to the field of silicon-on-insulator (SOI) structures and, more particularly, to the formation of a planar optical isolator component within an SOI structure.

BACKGROUND OF THE INVENTION

Optical isolators are well-understood in the art and find uses in optical communication systems, sensors and the like. The purpose of an optical isolator is to eliminate unwanted or reflected optical signals from interfering with a desired optical function. For example, an isolator may be inserted in an optical signal path between a distributed feedback (DFB) laser and an optical fiber. Without the isolator, unwanted optical signals (i.e., reflections) from the optical fiber would couple back into the DFB laser and adversely affect its transmitted optical spectrum. By including an isolator in this design, unwanted reflected signals are absorbed by the isolator and do not reach the laser. Non-planar optical isolators typically employ birefringent crystal plates (e.g., rutiles), half-wave plates and latching garnets or non-latching garnets with external magnets (hereinafter referred to in general as "Faraday isolators").

A planar, waveguide-based isolator has been developed in the optical domain for integration with a semiconductor light emitting diode, such as Fabry-Perot or ring laser diodes, as disclosed in U.S. Pat. No. 5,463,705, issued to R. Clauberg et al. on Oct. 31, 1995. In the Clauberg et al. arrangement, a waveguide directional coupler is formed within one layer of a III–V material system (e.g., GaAs, InP, etc.) so as to be integrated with a III–V based light emitting diode. The directional coupler is formed as a rib waveguide directional coupling structure, where at least one branch of the coupler includes an "absorber means" to collect a reflected, unwanted optical signal and reduce its further propagation through the coupler (i.e., "isolates" the reflected signal). While the Clauberg et al. waveguide coupler including at least one isolating branch may be integrated with a III–V light emitted device to increase optical efficiency, the emitter/isolator remains as a discrete component that must ultimately be combined with various other optical and electronic elements that are not well-suited to formation in III–V materials.

Indeed, as the complexity of optical system design increases, the need to monolithically integrate multiple optical and electrical functions onto a single material substrate is becoming a necessity, in order to reduce the size and cost of the optical system. It has recently been recognized that the materials, processes and fabrication techniques used in the production of silicon-based electronic devices can be adapted for the processing of optical elements. Advantageously, it has now been shown that various optical elements and their associated electronic activation devices can be integrated within the same substrate. The base materials system of choice for this simultaneous integration of electronics and optics is silicon-on-insulator (SOI), where the electronics have been well-characterized for many decades using CMOS processing technology, and the optics can be reduced to extremely small sizes as a result of the inherently high index optical guides that can be fabricated in SOI.

The monolithic integration of a conventional Faraday isolator into a planar silicon integrated circuit fabrication process is not considered to be practical. Indeed, the conventional Faraday isolator device relies on the use of the magneto-optic effect to rotate the light and provide isolation. Silicon does not exhibit any such magneto-optic effect. Various materials that do exhibit a magneto-optic effect are not considered to be compatible with conventional silicon semiconductor processing technology.

Thus, a need remains in the art for an optical isolator structure that is compatible with the silicon processing techniques used in the formation of SOI-based optoelectronic devices.

SUMMARY OF THE INVENTION

The need remaining in the prior art is addressed by the present invention, which relates to the field of silicon-on-insulator (SOI) structures and, more particularly, to the formation of a monolithic arrangement of a planar optical isolator and associated optic/electronic components within an SOI structure.

In accordance with the present invention, an optical waveguiding structure is formed within a silicon surface layer (strained or not strained) of an SOI structure (hereinafter referred to as the "SOI layer") to include a non-reciprocal, highly directional coupling arrangement. In the forward direction of propagation, an optical signal introduced into an input section of the optical waveguiding structure will thereafter propagate through the non-reciprocal, highly directional coupler essentially unaffected and thereafter propagate along an output section of the optical waveguiding structure. In the reverse direction, a reflected optical signal will be affected by the non-reciprocal, highly directional coupler such that most of the unwanted, reflected signal is intercepted and dissipated, while only a relatively small portion of the reflected signal will be coupled back into the input section of the waveguide.

In one embodiment of the present invention, the non-reciprocal highly directional coupler comprises a planar waveguide N-way splitter/combiner. The forward-directed signal is coupled into one of N−1 "input" waveguides, propagates through a coupling region and is then coupled into the "output" waveguide. In the reverse direction, a reflected signal coupled into the output waveguide will propagate through the coupling region and be "split" among each of the N−1 input waveguides. In accordance with this embodiment of the present invention, each of these N−1 input waveguides (except the input waveguide) is terminated by an isolating element to prevent further unwanted propagation of this reflected signal. In one exemplary configuration, a simple Y-combiner/splitter waveguide may be used as the non-reciprocal, highly directional coupler. In this case, the angle between the waveguides of the input port and the reflecting port should be relatively small (typically less than 50°) in order to obtain the required directionality. The Y-combiner may be formed as a symmetric combiner/splitter or an asymmetric combiner/splitter.

The isolating element may comprise a light absorbing element, such as a metal or silicide strip disposed over the waveguiding layer. In this case, the light absorbing element may also function as a photodetector, measuring the amount of reflected signal. Alternatively, a light diffusing element may be introduced into the isolating waveguide, such as a diffraction grating or tapered waveguide. Indeed, an isolating element of the present invention may be formed as a combination of a light absorbing element and a light radiating element. Any of these isolating arrangements are advantageously compatible with conventional planar CMOS processing techniques, allowing for various other desired optical and electrical components to be integrated with the optical isolator and form a monolithic arrangement.

In an alternative embodiment of the present invention, the non-reciprocal, highly-directional optical isolator comprises an optical waveguide signal expansion region disposed between an optical input waveguide region and an optical output waveguide region. Particularly, the signal expansion region is formed, using conventional, well-known planar CMOS processing techniques to exhibit a geometry such that the larger end of the expansion region is adjacent to the input waveguide region, and then tapers (symmetrically) in the direction of the output waveguide section. With this structure, a transmitted signal propagating along the input section of the waveguide will first encounter the larger end of the expansion section and begin to "fill" this section. The expansion section is configured to taper towards the output coupling region such that the transmitted signal will maintain its mode and ultimately be coupled into the output waveguide region. In the reverse direction, a "reflected" signal will propagate through the output waveguide region and enter the signal expansion region at the tapered end. The reflected signal will continue to expand and fill the full extent of the expansion region. Inasmuch as the input waveguide region is in contact with this larger end of the expansion region, only a minimal amount of the reflected signal will enter the input coupling region. Indeed, most of the (unwanted) reflected signal will reflect around in the expansion region and be ultimately lost through dissipation.

An advantage of the SOI-based, planar optical isolator of the present invention is that an additional, patterned polysilicon layer may be formed over certain portions of the waveguide structure and improve the amount of isolation that may be achieved. By virtue of using well-known planar CMOS processing technology, the location, size and shape of the desired polysilicon layer can be well-controlled.

Indeed, by virtue of utilizing the SOI structure, a plurality of SOI-based planar isolators (and associated components) of the present invention may be disposed in a cascaded, monolithic arrangement within a single SOI substrate such that the isolation is improved with each stage added to the structure. Thus, if a single stage isolator is capable of providing 3 dB isolation (presuming a 50:50 split between the input port and a single reflecting port), a cascaded arrangement of ten such isolators will provide approximately 30 dB of isolation.

Other and further advantages and arrangements of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
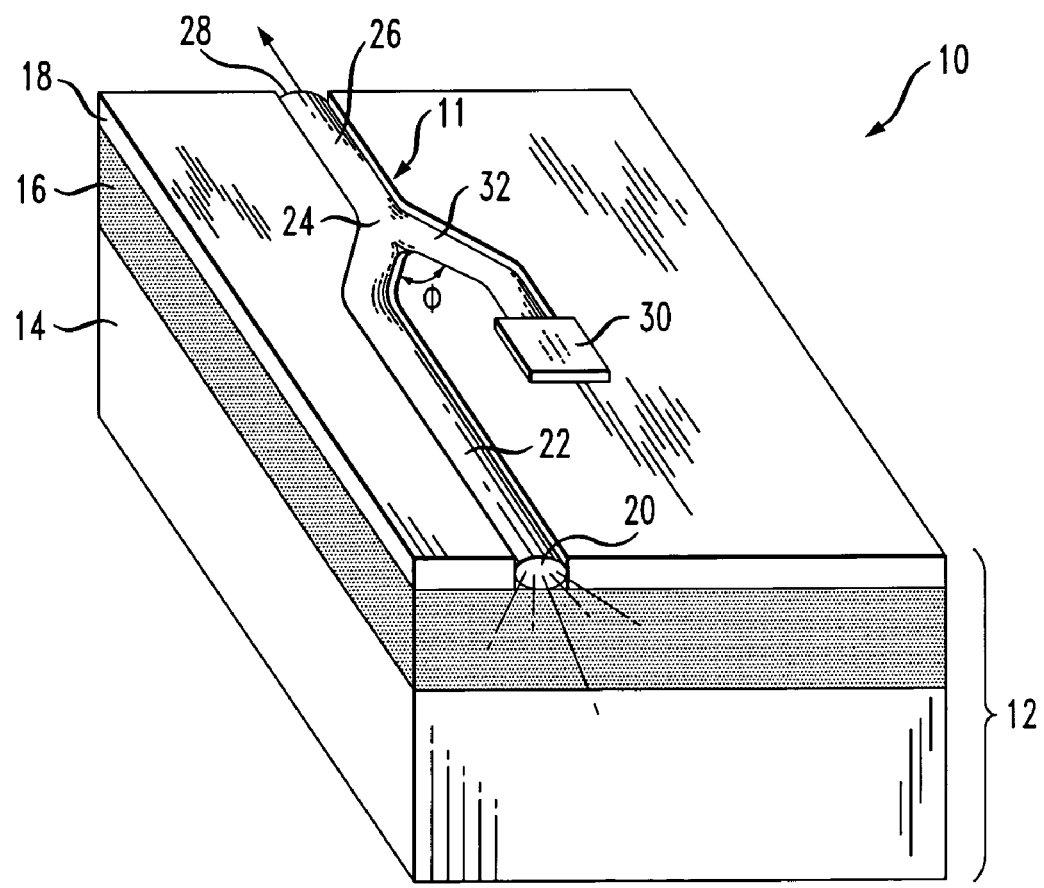
FIG. 1 is an isometric view of an exemplary single stage, SOI-based planar isolator formed in accordance with one embodiment of the present invention.

FIG. 1 contains an isometric view of an exemplary SOI-based planar optical isolator 10 formed in accordance with the present invention. Optical isolator 10 is formed within a silicon-on-insulator (SOI) structure 12 comprising a silicon substrate 14, an insulating dielectric layer 16 (usually comprising $SiO_2$) and a surface single crystal silicon layer 18 (typically referred to in the art as the "SOI layer"). In most cases, SOI layer 18 will comprise a thickness of less than one micron. In some cases, the surface silicon layer may comprise a "strained" silicon layer, where the lattice structure of the silicon has been modified. Although not particularly illustrated in FIG. 1, or any of the following drawings, it is to be understood that in actual use, the associated opto-electronic components are formed within the same SOI structure 12, thus forming an efficient, monolithic optical system arrangement.

In accordance with the present invention, optical isolator 10 includes a non-reciprocal, highly directional coupler 11 formed, at least in part, within SOI layer 18 using well-known planar CMOS processing technology. For the particular embodiment of FIG. 1, highly directional coupler 11 comprises an N-way optical waveguide splitter/combiner (where in the arrangement of FIG. 1, N=2 and the coupler comprises a Y-coupler geometry). It is to be understood that this geometry is exemplary only, and various other types of highly directional coupling arrangements (i.e., an "input waveguide section", "output waveguide", at least one "isolating waveguide section") may be formed that exhibit the isolating ability of this particular embodiment of the present invention. As shown in FIG. 1, optical isolator 10 comprises an input port 20 for receiving an input optical signal. In most cases (particularly where a sub-micron SOI layer is used), the propagating signal will comprise a single mode signal. The optical signal thereafter propagates along an input waveguide section 22 and enters a coupling region 24. An output waveguide 26 is coupled to coupling region 24 and thus supports the transmission of the forward-propagating optical signal toward an output port 28.

Isolation in this arrangement is provided, in accordance with the present invention, by the utilization of an isolating element 30 disposed over an isolating waveguide 32, where isolating waveguide 32 is also coupled to coupling region 24, as shown in FIG. 1. In the embodiment of FIG. 1, isolating element 30 comprises an optically absorbing material 34 (such as a metal, germanium, SiGe, highly-doped silicon or silicide) that functions to collect the propagating optical signal. As will be discussed below in association with FIG. 5, an optical radiating arrangement (such as a diffraction grating or taper) may be formed within isolating waveguide 32 and used to disperse the reflected optical signal propagating along isolating waveguide 32.

Advantageously, well-known planar CMOS processing technologies may be used to form the requisite isolating element of the present invention. In particular, the deposition of metals and/or the formation of silicides through the reaction of the SOI layer with a deposited metal are well understood. Indeed, as discussed above, the ability to use conventional planar CMOS processing technology allows for the planar optical isolator of the present invention to be incorporated with various other opto-electronic elements into a monolithic, SOI-based arrangement.

As mentioned above, silicon does not have a magneto-optic effect. Therefore, the optical isolator of the present invention is based upon the non-reciprocal geometry of the highly direction coupler (in contrast to the non-reciprocal optical properties of a magneto-optic device). In particular, it is preferred that the angle between input waveguide 22 and isolating waveguide 32 be no more than 50°. Advantageously, the polarization orientation of light exiting isolator 10 will be the same as the polarization orientation of the light entering isolator 10. This continuity in polarization is desirable for silicon waveguides, where certain optical modes (TE or TM) propagate with less optical loss than other modes. The dependencies on temperature and wavelength associated with magneto-optic materials and Faraday rotation, as used in prior art isolators, are not present in the inventive SOI-based planar optical isolator structure. Moreover, as mentioned above, the use of an SOI-based optical isolator structure allows for integration with various other SOI-based components (optical and/or electrical), where the planar geometry of the inventive isolator is also considered advantageous from a performance point of view.

Figure 3:
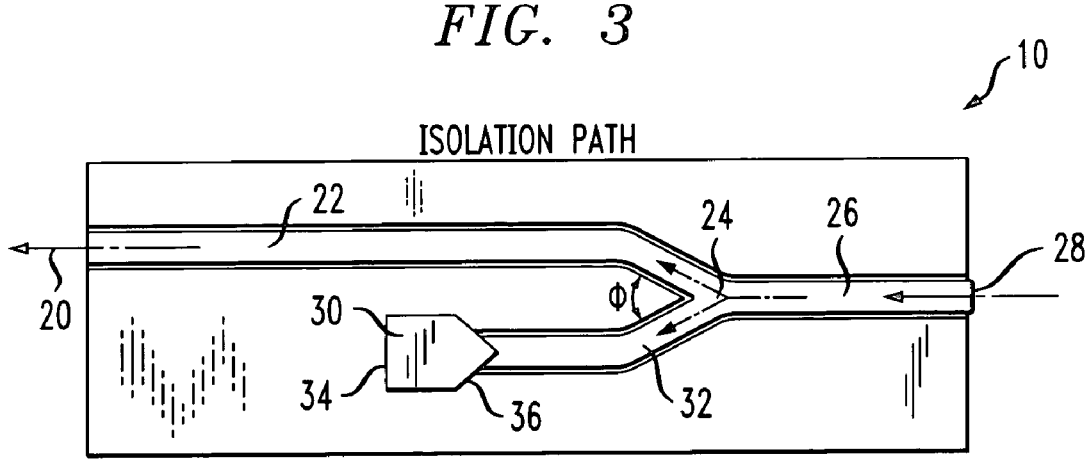
FIG. 3 is a top view of the arrangement of FIG. 1, illustrating its performance in the rearward (isolating) direction.

When reflected light enters the boundary of isolating element 30, reflections will again occur (due to the mismatch between the absorbing/scattering region and the waveguide region). These reflections can be minimized by forming a transition region that provides a more graceful transition in optical mode coupling between isolating waveguide 32 and isolating element 34. FIG. 3 (which will be described in more detail hereinbelow) illustrates an exemplary arrangement of the present invention that includes an input tapered region 36 with isolating element 34, where the taper will provide for the desired transition in effective index.

Figure 2:
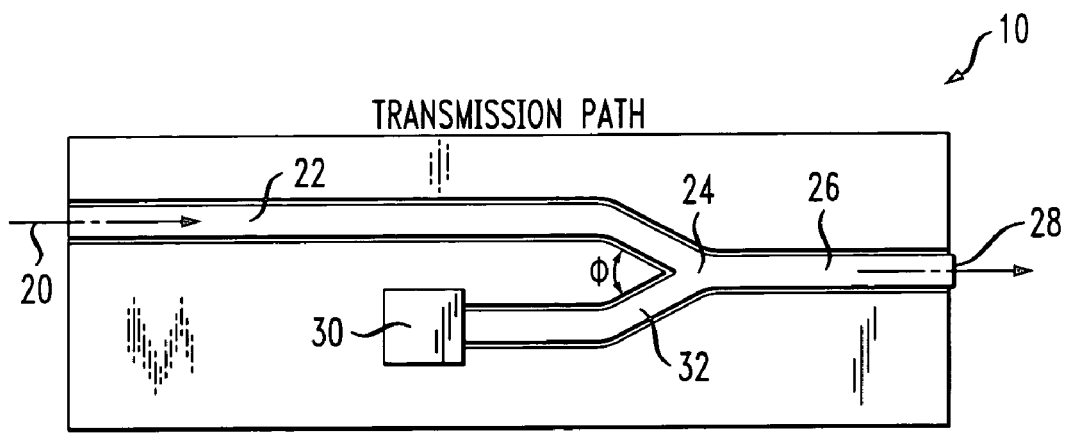
FIG. 2 is a top view of the arrangement of FIG. 1, illustrating its performance in the forward (transmitting) direction.

FIG. 2 is a top view of SOI-based planar isolator 10 of FIG. 1, illustrating in particular the propagation of an optical signal in the forward (transmitted) direction. As shown, an input optical signal is coupled via input port 20 into input waveguide 22. The signal passes through coupling region 24 and thereafter into output waveguide 26, exiting isolator 10 at output port 28. The isolation path for isolator 10 is illustrated in FIG. 3. As shown, a "reflected" optical signal enters isolator 10 at output port 28 and thereafter propagates along output waveguide 26 and enters coupling region 24. In this case, coupling region 24 will function as a Y-splitter, coupling the reflected signal into both input waveguide 22 and isolating waveguide 32. As discussed above, the angle Φ between input waveguide 22 and isolating waveguide 32 needs to be relatively small, in order to provide the desired high directional coupling effect of combining region 24. In particular, maintaining Φ to be less than 50° is considered to be preferable. In accordance with the present invention, the portion of the reflected optical signal propagating along isolating waveguide 32 will be captured by isolating element 30, effectively preventing further propagation of that portion of the reflected signal.

In general, and as mentioned above, isolating element 30 may comprise an optical absorbing element, an optical radiating element, or any combination thereof. In the particular embodiment illustrated in FIG. 3, isolating element 30 comprises an absorbing material 34 that is disposed over (and/or within) a portion of isolating waveguide 32, where absorbing material 34 functions to capture the optical signal and prevent further propagation. Absorbing material 34 may comprise a metal (such as, for example, titanium, tantalum, aluminum, copper, etc.), a silicide (such as, for example, cobalt silicide, titanium silicide, etc ), or any appropriate silicon processing-compatible material (such as, for example, germanium, highly-doped silicon, SiGe, etc.). Indeed, any suitable material that functions to absorb a propagating lightwave may be used. As further shown in FIG. 3, absorbing material 34 (in this particular arrangement) is formed to include an input taper 36, where taper 36 reduces secondary reflections back along reflecting waveguide 32 by introducing a transitional change in effective index along waveguide 32 (instead of an "abrupt" change that would be associated with the disposition of a conventional layer of metal/silicide/conducting material over isolating waveguide 32). Advantageously, absorbing material that produces an electric current proportional to the amount of absorbed light can be configured as an optical photodetector and used to measure the amount of absorbed light. Indeed, by virtue of the ability to include electronics with the planar, SOI-based isolator of the prior art, additional electronic circuitry (for example, a feedback circuit) may be integrated with the detector and used to monitor the amount of reflected signal to control/adjust various other optical system parameters.

In the embodiment as illustrated in FIGS. 1–3, highly directional coupler 11 comprises the form of a Y-combiner, and is presumed to affect a 50:50 split of an optical signal in the reverse, reflected direction. Presuming also that a single mode optical signal is propagating through the coupler, a 3 dB amount of isolation will be introduced into the reflected signal. Theoretically, any other desired split ratio may be used. For example, a 10:90 split of an optical signal in the reverse, reflected direction would produce 10 dB of isolation into the reflected signal. Alternatively, an improvement in the amount of isolation provided by a single stage, SOI-based planar isolator of this particular N-way optical waveguide splitter/combiner of the present invention can be accomplished by using a multiple arm planar highly directional coupler.

Figure 4:
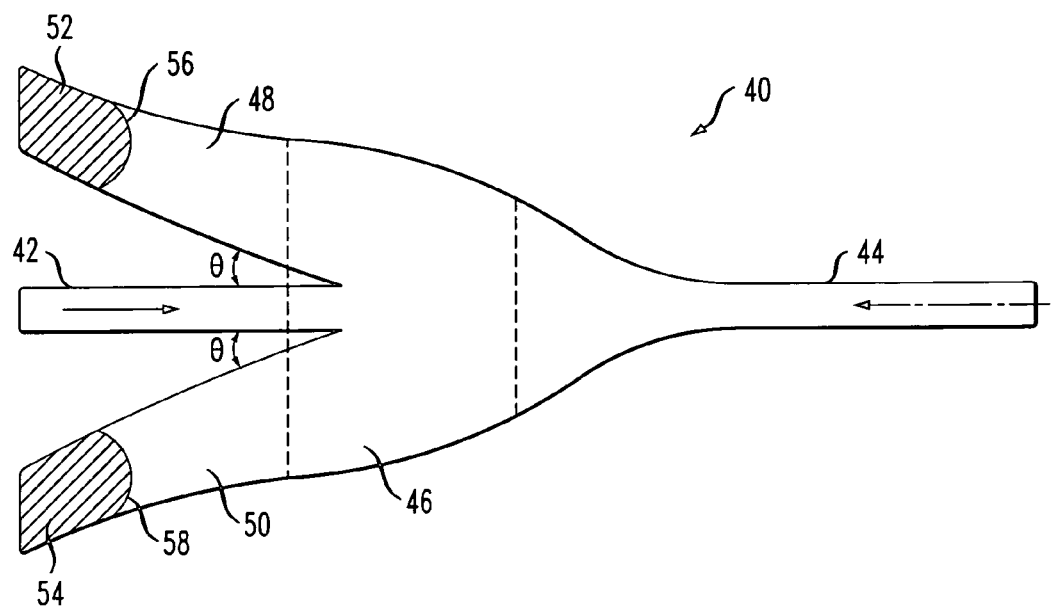
FIG. 4 is a top view of another arrangement of the first embodiment of a single stage, SOI-based planar isolator of the present invention, utilizing a multiple arm splitter/combiner configuration.

FIG. 4 contains a top view of one such multiple-arm planar isolator 40 of the present invention, including an input waveguide 42, an output waveguide 44, a coupling region 46, and a pair of isolating waveguides 48, 50. Referring to FIG. 4, isolator 40 is shown as having a separate one of isolating waveguides 48, 50 disposed on either side of input waveguide 42, with a predetermined angular displacement θ between each reflecting waveguide 48, 50 and input waveguide 42. First isolating waveguide 48 is illustrated as including a first isolating element 52 and second isolating waveguide 50 is illustrated as including a second isolating element 54. Isolation elements 52, 54 may comprise an optically radiating structure, an optically absorbing structure, or a combination of both. Moreover, as discussed above, each isolating element may further comprise an input tapered section to prevent secondary reflections, these input tapered sections illustrated as components 56, 58 in FIG. 4.

In this particular embodiment of the present invention, an unwanted, reflected signal propagating along output waveguide 44 will pass through adiabatic coupling region 46 and be coupled into both isolating waveguides 48, 50, as well as input waveguide 42. By controlling the geometry of isolating waveguides 48, 50, as well as the angular displacement θ between the isolating waveguides and the input waveguide, a significant portion of the unwanted reflected signal can be directed into isolating waveguides 48, 50 and isolated from further backward propagation along input waveguide 42 by isolating elements 52, 54. Importantly, coupling region 46 is configured to adiabatically taper between the input/ reflecting waveguides and the output waveguide so as to maintain mode matching between the forward-directed transmitting signal propagating along input waveguide 42 and output waveguide 44.

Figure 5:
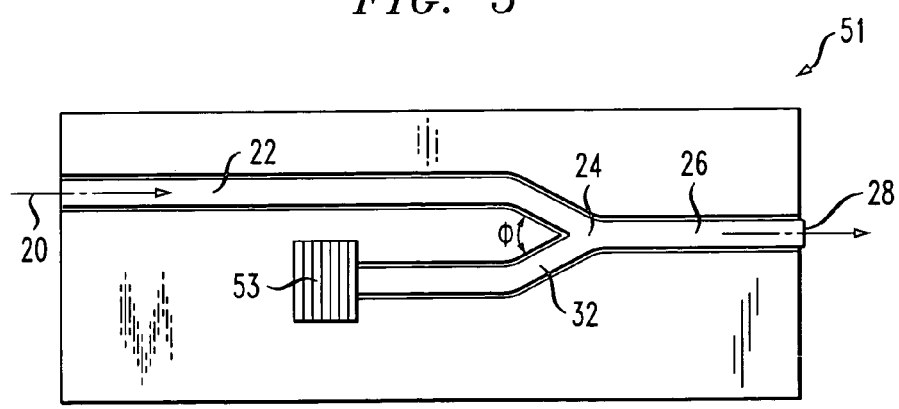
FIG. 5 is a top view of an alternative realization of the first embodiment of the present invention, utilizing an optical scattering element to provide the desired optical isolation.

As mentioned above in association with FIGS. 1–3, isolating element 30 may take the form of a grating structure, tapered waveguide, or any other dispersive element that would function to radiate the light signal entering isolating element 30. FIG. 5 is a top view of an alternative arrangement of this N-way optical waveguide splitter/combiner embodiment of an SOI-based planar optical isolator 51 of the present invention, where like elements from the configuration of FIGS. 1–3 contain like reference numerals in FIG. 5. In this case, isolating element 30 takes the form of a diffraction grating 53 formed within isolating waveguide 32. Since SOI layer 18 comprises silicon, any suitable technique for etching or otherwise patterning SOI layer 18, as well known from the CMOS processing technology, may be used to form the desired configuration of diffraction grating 53 directly within reflecting waveguide 32. Indeed, the pitch, period and/or other grating characteristics of grating 53 may be controlled by CMOS processing techniques (etching, for example) so as to introduce a gradual change in the effective index between isolating waveguide 32 and isolating element 30.

Figure 6:
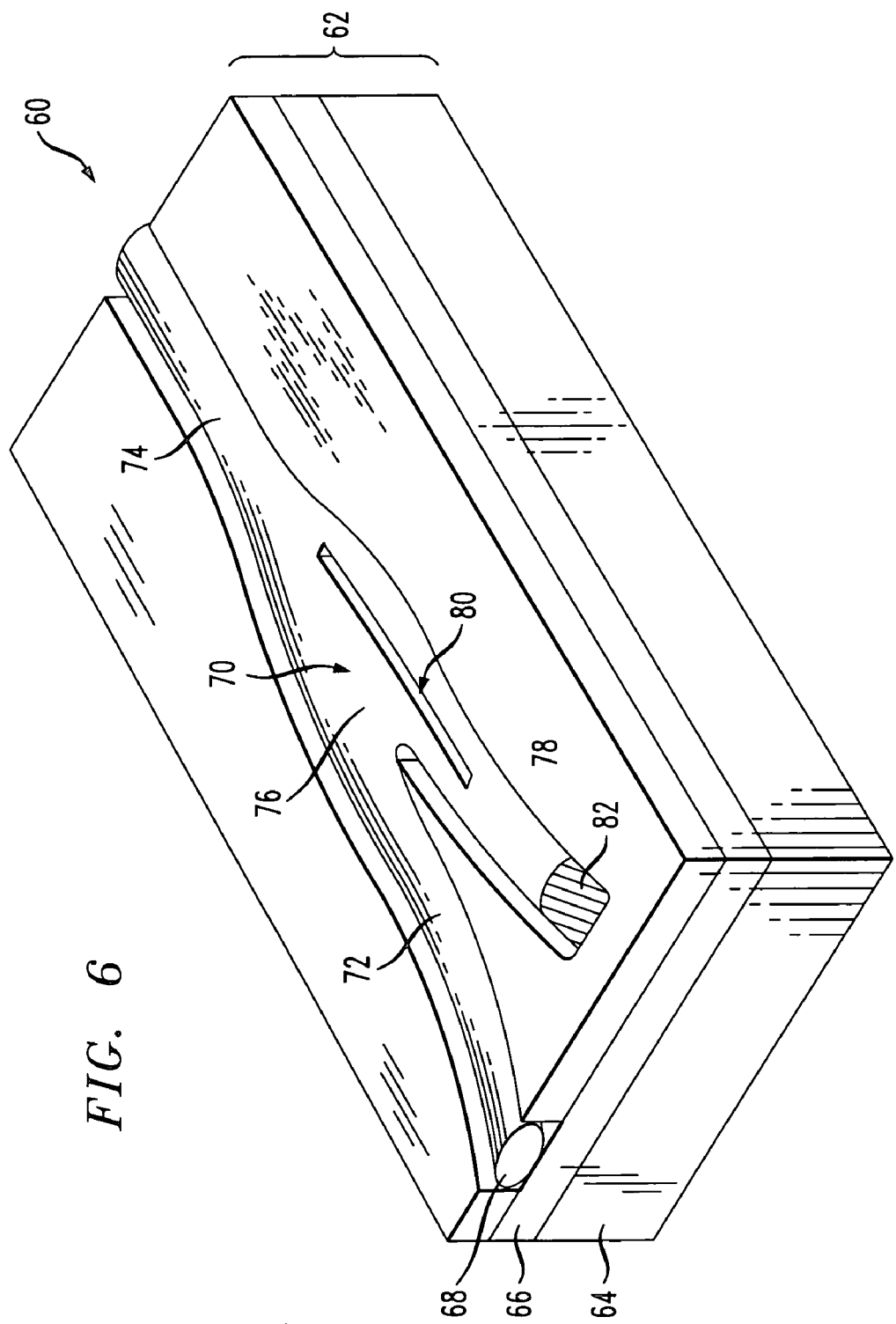
FIG. 6 contains an isometric view of an embodiment of the present invention, utilizing a polysilicon structure disposed over the SOI layer.

In some SOI-based structures, a polysilicon layer is utilized, in association with the SOI layer (perhaps a strained silicon SOI layer), to create the waveguiding structure. Additional isolation may be achieved, in accordance with the present invention, by using a patterned polysilicon layer disposed on selected portions of the various above-described isolator arrangements. FIG. 6 illustrates an exemplary optical isolator 60 of the present invention that includes a polysilicon structure. As shown, optical isolator 60 is formed using an SOI structure 62 including a silicon substrate 64, an isolating layer 66 and SOI layer 68 (where SOI layer 68 is generally less than one micron in thickness). A highly directional Y-coupler 70, used to provide isolation in accordance with the present invention, is formed to include an input waveguiding structure 72, an output waveguiding structure 74, an optical combining region 76 and an isolating waveguiding structure 78. In this particular embodiment of the present invention, highly directional coupler 70 comprises a patterned polysilicon layer 80 disposed over a portion of isolating waveguiding structure 78, as shown. The presence of polysilicon layer 80 will modify the amount of reflected optical signal directed into isolating waveguiding structure 78 and thus improve the isolation properties of the arrangement. Moreover, the particular configuration of polysilicon layer 80 will have a minimal effect on the desired, forward-directed propagating optical signal.

As with the embodiments discussed above, isolation of an unwanted, reflected signal is provided by including an isolating element 82 over (or within) isolating waveguiding structure 78. Indeed, similar to the above arrangements, isolating element may comprise an optical absorbing component, an optical radiating component, or any combination thereof. The use of well-known CMOS processing technology allows for patterned polysilicon layer 80 to easily be formed, and proportioned to provide the desired improvement in isolation.

Figure 7:
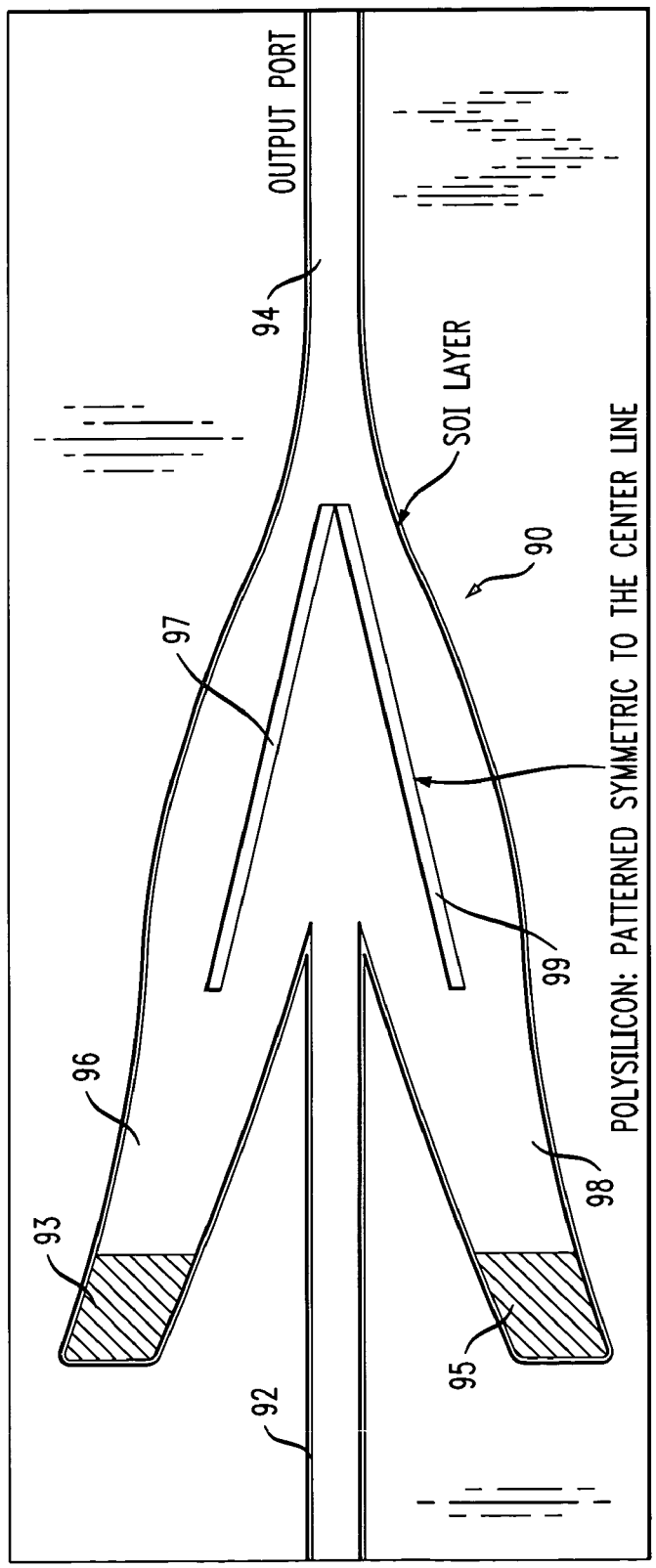
FIG. 7 contains a top view of an exemplary multiple arm splitter/combiner configuration of the inventive isolator that includes the use of a patterned polysilicon layer.

An exemplary 3-way optical waveguide splitter/combiner isolator 90 of the present invention, including a patterned polysilicon structure, is shown in a top view in FIG. 7. In this case, isolator 90 comprises an input waveguiding section 92, output waveguiding section 94, and a pair of isolating waveguide sections 96 and 98, with isolating waveguide section 96 including an isolating element 93 and isolating waveguide section 98 including an isolating element 95. A patterned polysilicon layer in the form of symmetric regions 97 and 99 is shown as disposed over isolating waveguide sections 96 and 98, respectively. As with the arrangement discussed above in association with FIG. 6, the presence of polysilicon regions 97, 99 will cause a larger amount of reflected (unwanted) optical signal energy to be guided into isolating waveguiding sections 96, 98, further increasing the amount of isolation achievable with this structure. It is to be understood that the particular geometry of regions 97, 99 is exemplary only, and various other polysilicon regions (or a single region) may be used to improve the isolation properties of the inventive structure.

Figure 8:
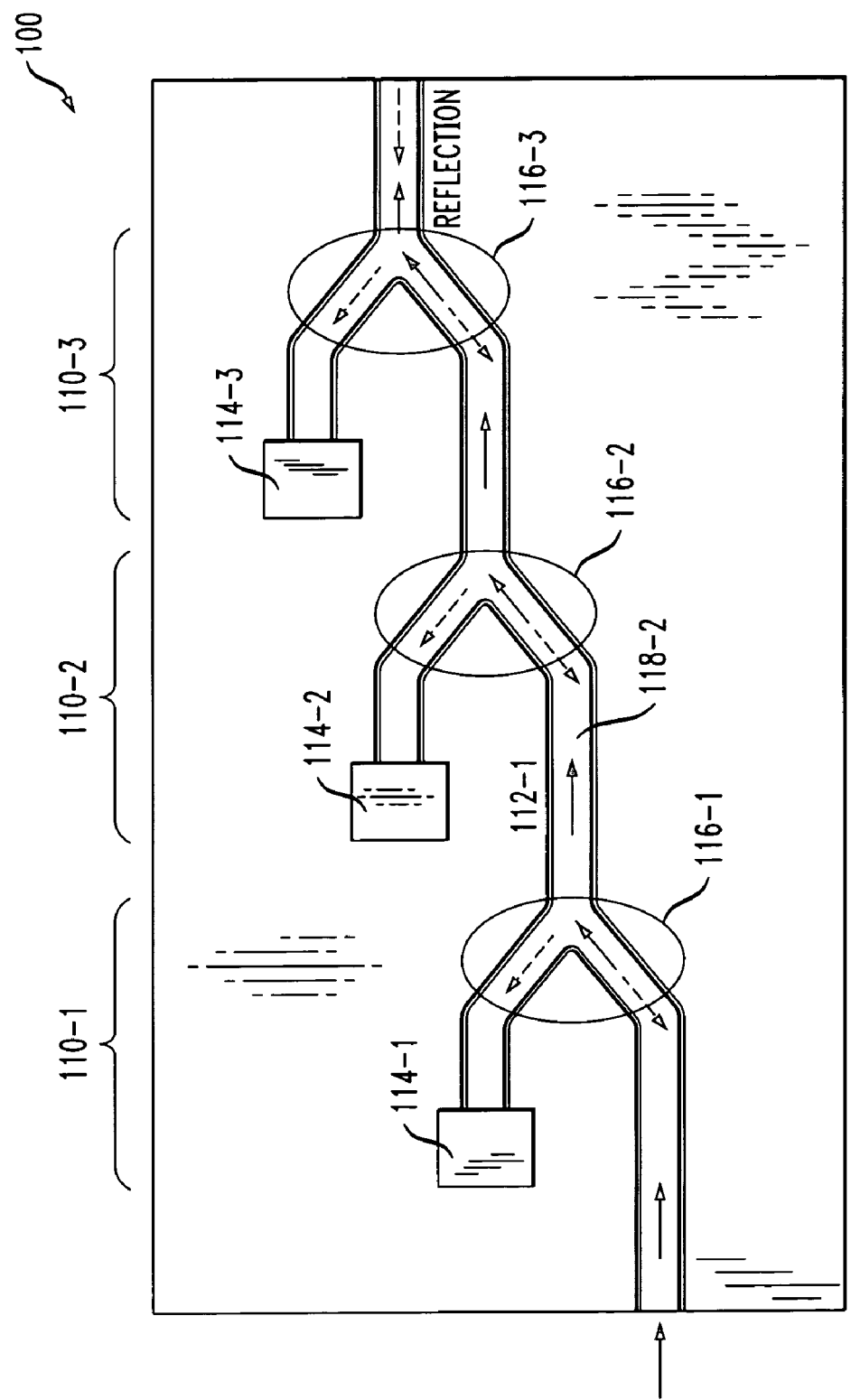
FIG. 8 is a top view of an exemplary three-stage SOI-based planar isolator of the first embodiment of the present invention.

FIG. 8 illustrates an alternative, multi-stage arrangement of the N-way optical waveguide splitter/combiner embodiment of the present invention. Advantageously, the utilization of an SOI-based isolator employing well-known planar CMOS fabrication technology allows for multiple, essentially identical isolator stages to be formed and coupled together as a monolithic structure. As shown in FIG. 8, multi-stage SOI-based planar optical isolator 100 comprises three separate isolation stages, denoted as 110-1, 110-2 and 110-3 in the drawing. Each stage is formed in an exemplary Y-combiner configuration as discussed above (any other appropriate N-way splitter/combiner geometry may be used), where in the "forward" direction, the optical signal exiting output port 112-1 from stage 110-1 is applied as the input signal (at input port 118-2) of isolator stage 110-2, and so on. In the reverse (isolating) direction, each highly directional coupler 116-1, 116-2 and 116-3 will function to remove a predetermined portion (for example, half) of any reflected signal, where the removed portion is thereafter intercepted by isolating element 114-1, 114-2 and 114-3. Since each isolator in this particular embodiment will add (for example) a 3 dB level of isolation, the cascaded arrangement as illustrated in FIG. 7 will provide a 3 dB drop in reflected/isolated signal at each stage. Thus, if a 10-stage isolator were to be utilized, a 30 dB drop in reflected signal could be expected. An even higher degree of isolation may be accomplished, for example, by utilizing a multi-stage isolator utilizing the multiple arm configuration discussed above in association with FIG. 4 or, alternatively, a "poly-loaded" arrangement as shown in FIGS. 6 and 7.

Figure 9A:
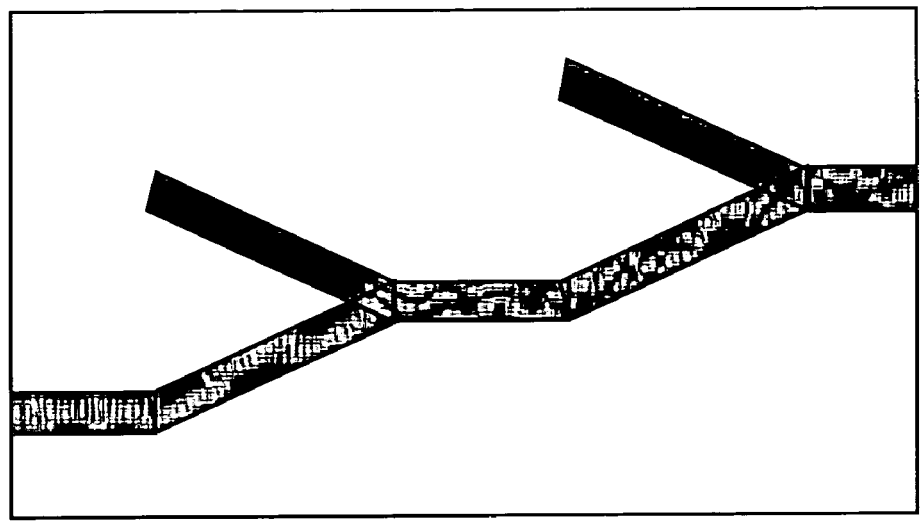
FIG. 9 contains graphical representations of the forward light propagation (FIG. 9A) and the attenuation of the back-scattered light (FIG. 9B)
Figure 9B:
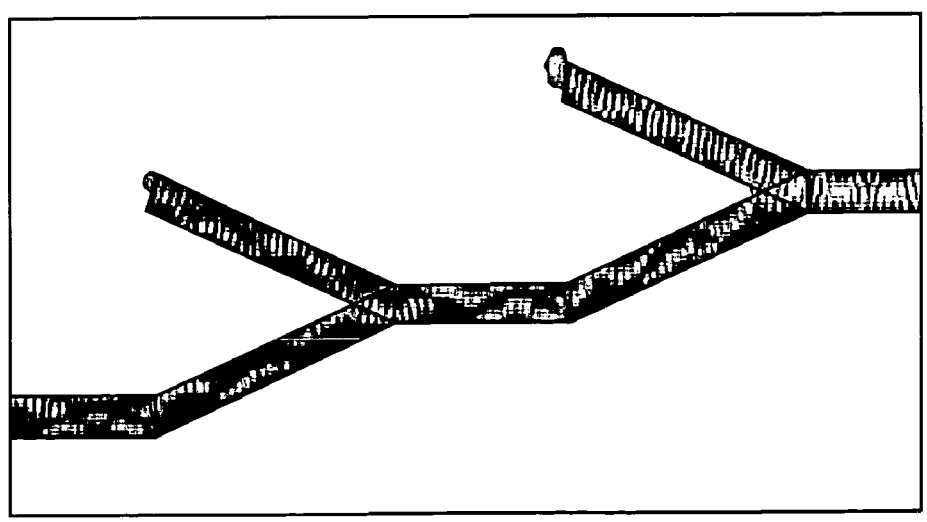

FIG. 9 is a graphical representation of a simulation of a light signal propagating along the multi-stage isolator 100 of FIG. 8, where FIG. 9A illustrates the propagation of light in the forward direction. FIG. 9B illustrates the propagation of reflected light in the reverse direction. As shown, the presence of a highly directional coupler, in combination with an isolating element, serves to significantly reduce the presence of a reflected signal at input port 20.

Figure 10:
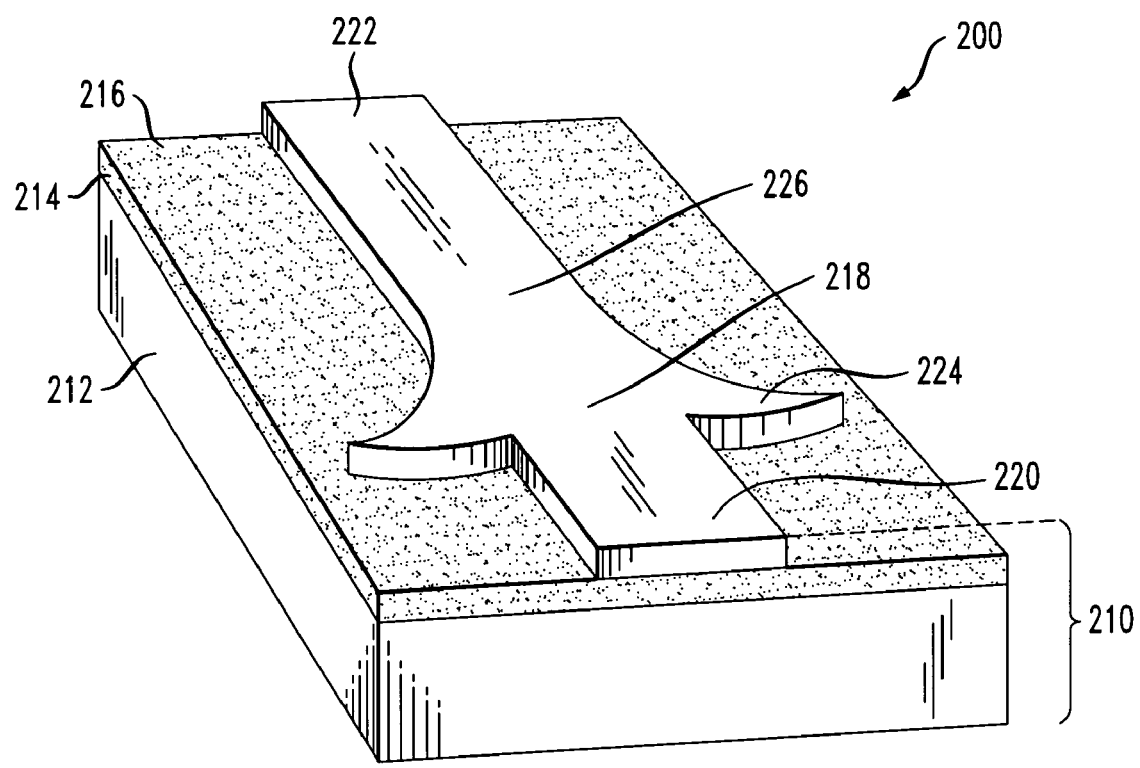
FIG. 10 contains an isometric view of a second embodiment of the present invention, utilizing an optical waveguiding expansion region to provide for isolation of an input SOI-based waveguide from reflected signals.
Figure 11:
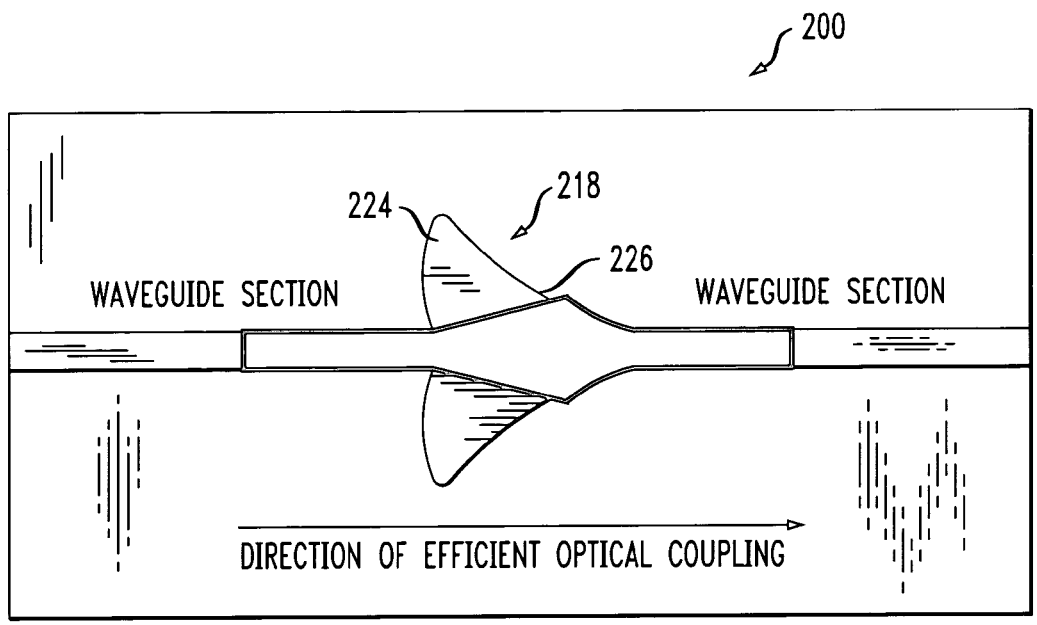
FIG. 11 is a top view of the embodiment of FIG. 10 in the forward, transmitting mode.
Figure 12:
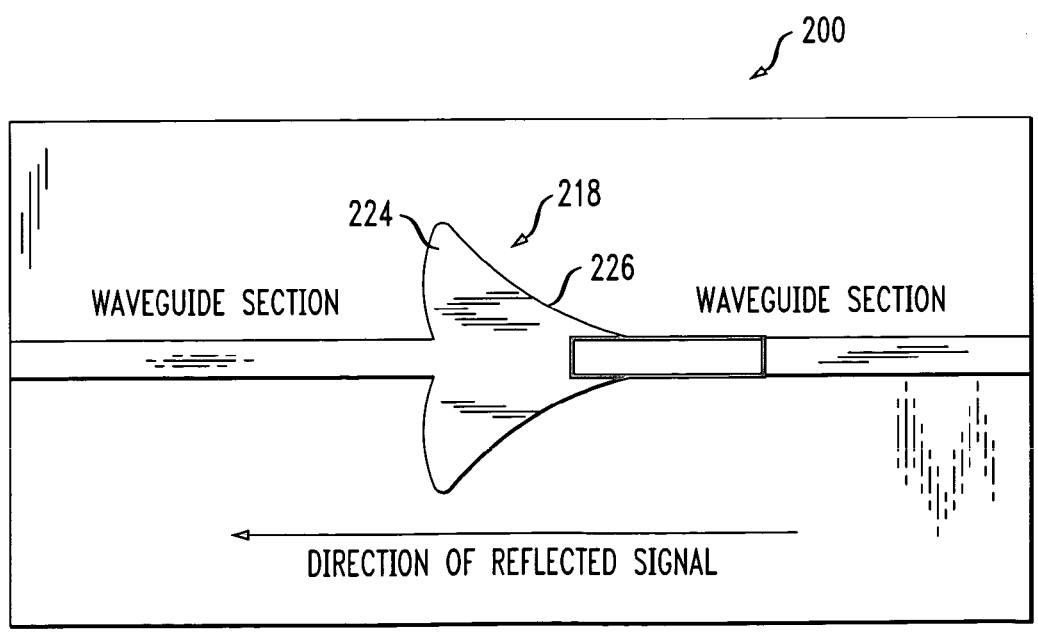
FIG. 12 is a top view of the embodiment of FIG. 10 in the rearward, reflecting mode.

As mentioned above, the present invention in its most general form is based on the realization that a planar waveguide structure may be formed in an SOI system to as to exhibit a non-reciprocal, highly directional geometry and, as a result, provide a passive optical isolation function. The embodiment as described in associated with above FIGS. 1–9 are associated with using an N-way optical waveguide splitter/combiner as the non-reciprocal, highly directional coupler. Various other geometries have been contemplated and are capable of providing the desired non-reciprocity and optical signal isolation. FIGS. 10–12 illustrate one such other embodiment of a non-reciprocal, highly directional, planar SOI-based optical isolator formed in accordance with the present invention.

FIG. 10 contains an isometric view of an exemplary SOI-based planar optical isolator 200 formed in accordance with the present invention. Optical isolator 200 is formed within a silicon-on-insulator (SOI) structure 210 comprising a silicon substrate 212, an insulating dielectric layer 214 (usually comprising SiO$_2$) and a surface single crystal silicon layer 216 (typically referred to in the art as the "SOI layer"). In most cases, SOI layer 216 will comprise a thickness of less than one micron, and may be formed as a strained silicon layer. As shown, SOI layer 216 has been patterned, using conventional CMOS processing technology, to form a non-reciprocal, highly directional waveguide expansion section 218, input waveguiding section 220 and output waveguiding section 222. FIGS. 11 and 12 contain top views of optical isolator 200 in the "transmitting" and "isolating" modes, respectively.

In accordance with the present invention, expansion section 218 is formed between input waveguiding section 220 and output waveguiding section 222 so as to function as a signal expander/dissipater for reflected (unwanted) signals propagating from output waveguide section 222 towards input waveguiding section 220. Expansion section 218 is formed to include an enlarged region 224 adjacent to input waveguiding section 220 and a tapered transition region 226 adjacent to output waveguiding section 222. Referring to FIGS. 10 and 11, when a transmitted optical signal is propagating along input waveguiding section 220 (in the direction as indicated in FIG. 11), the optical signal will encounter enlarged region 224 of expansion section 218, and begin to expand in mode to fill the confines of enlarged region 224. Thereafter, however, the propagating signal will enter transition section 226 and gradually diminish in overall size so as to provide essentially complete coupling of the propagating signal into output waveguiding section 222. Thus, in the forward direction, the complete optical signal passes from the input to the output.

The isolating function of this embodiment of the present invention may be understood with reference to FIGS. 10 and 12. In this case, a reflected (unwanted) signal is propagating in the backward direction along output waveguiding section 222 (as shown by the arrow in FIG. 12). The reflected signal then enters transition region 226, which functions to slowly increase the mode size of the reflected signal, continuing to expand the mode diameter as the signal enters enlarged region 224 of expansion section 218. Therefore, as shown in particular in FIG. 12, when the reflected optical signal encounters the interface between input waveguiding section 220 and enlarged region 224, the majority of the signal will be "lost" to improper matching, permitting only a small fraction of the optical signal, as shown, to be coupled into input waveguiding section 220. The remainder of the signal will be reflected at the mismatched index barrier between the silicon expansion section 218 and the material used to planarize the SOI structure. In most cases, a blanket deposited layer of silicon dioxide is used for this planarize (as is common in conventional CMOS electronic circuits). The reflected signal continues to reflect off surfaces within enlarged region 224 and transition region 226 until it is sufficiently dissipated. Preferably, tapered transition region 226 is formed to exhibit an adiabatic taper, so as to avoid any resonant effects to be generated over the wavelength range of interest.

This particular embodiment of the present invention, utilizing an in-line expansion section, thus provides a relatively large degree of isolation without the need to include separate isolating elements (such as absorbing or radiating elements) within the waveguiding structure. However, an even greater degree of isolation (with less worry about reflected signals within expansion section) can be had by including an isolating element (either an absorbing element or radiating element, as discussed above) with selection portions of expansions section 218. Other arrangements for dissipating the reflected signal at the termination of enlarged region 224 may be used, such as forming a trench region along the perimeter of enlarged region 224.

Figure 13:
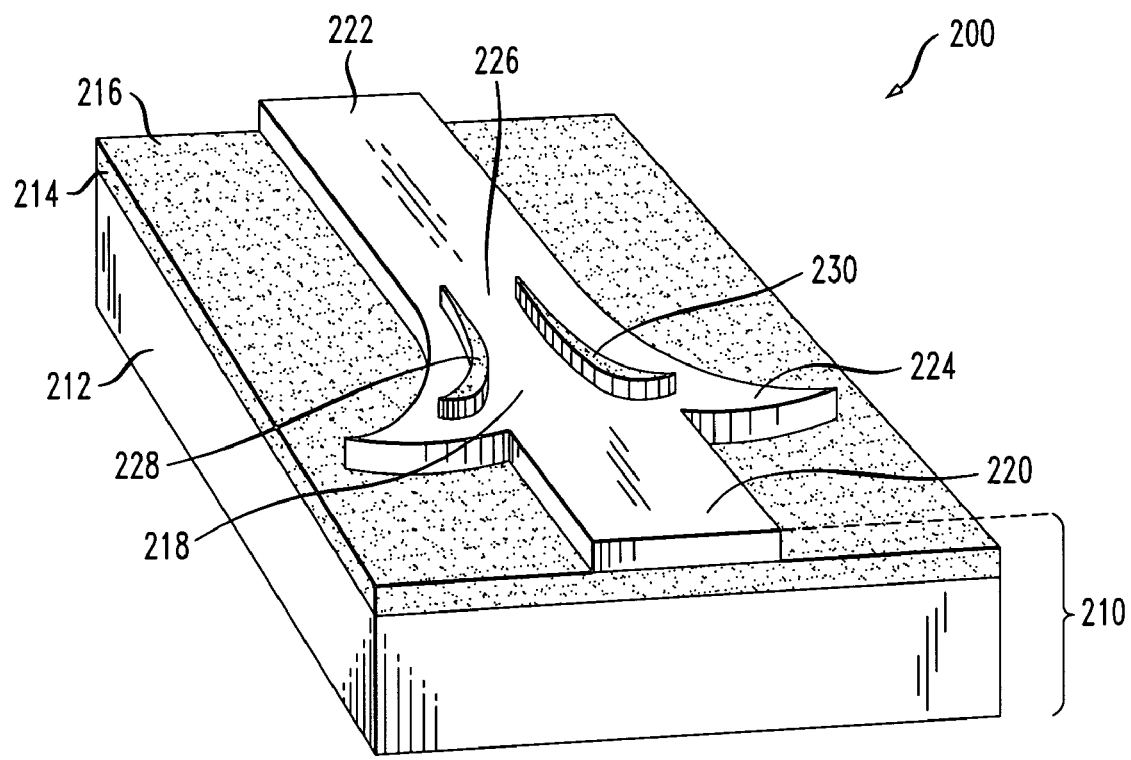
FIG. 13 is an isometric illustration of an alternative configuration of the second embodiment, including a patterned polysilicon layer over the SOI-based waveguide expansion region.
Figure 14:
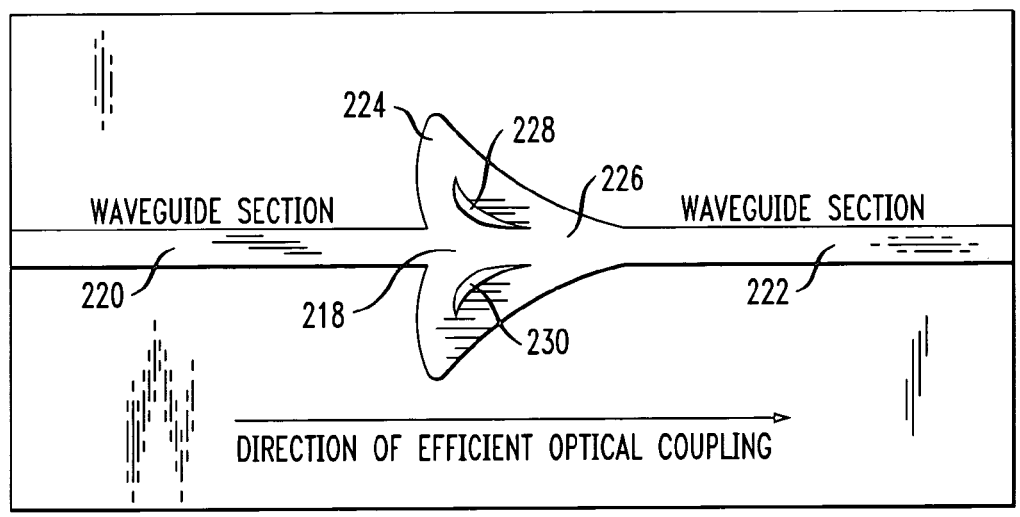
FIG. 14 is a top view of the arrangement of FIG. 13.

As with the N-way optical waveguide splitter/combiner embodiment discussed above, a patterned polysilicon layer may be added to the structure of FIG. 10 to provide for an improved degree of isolation. FIG. 13 is an isometric view of an exemplary arrangement of the expansion waveguide section embodiment of the present invention (utilizing the same reference numerals as FIG. 10), with the inclusion of polysilicon regions 228, 230 over selected portions of expansion section 218. Polysilicon regions 228 and 230 are patterned so as to be symmetric with respect to the optical axis of a forward-propagating signal so as to not interact with this signal or degrade the transmissive properties of the invention optical isolator arrangement. FIG. 14 is a top view of the same arrangement. It is to be understood that the particular polysilicon pattern shown in FIGS. 13 and 14 is considered to be exemplary only. Various other polysilicon patterns may be used to improve the isolator performance of the inventive structure.

Figure 15:
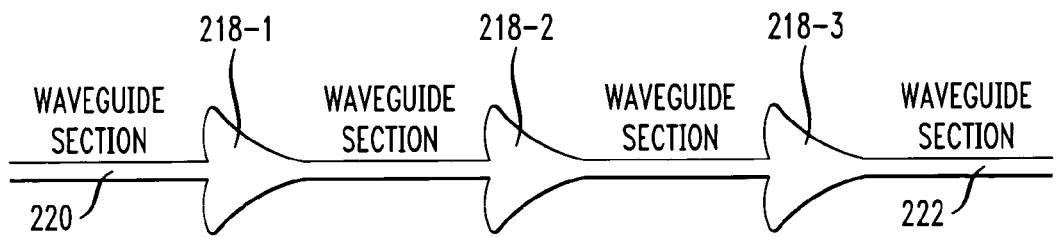
FIG. 15 is a simplified diagram of a three-stage planar, SOI-based optical isolator formed in accordance with the second embodiment of the present invention.

As mentioned above, a considerable advantage of the SOI-based structure of the present invention is the ability to integrate the inventive isolator with various other optical and electrical components in a monolithic arrangement. Further, the use of conventional CMOS process technology allows for an N-stage planar SOI-based optical isolator to be formed, where each stage is essentially the expanded-waveguide isolator design of FIG. 10. FIG. 15 illustrates a 3-stage isolator formed in accordance with this aspect of the present invention. As shown, a set of three expansion sections 218-1, 218-2 and 218-3 are disposed in a distributed fashion along the length of the optical waveguide, where an initial input waveguide 220 is illustrated as coupled to first expansion section 218-1, and a final output waveguide 222 is illustrated as coupled to the last expansion section 218-3.

It will become apparent to those skilled in the art that various modifications to the preferred embodiments of the present invention as described herein can be made without departing from the spirit or scope thereof. Indeed, the subject matter of the present invention is intended to be limited only by the scope of the claims, as appended hereto:

What is claimed is:

1. A planar optical isolator formed within a sub-micron thick surface silicon layer of a silicon-on-insulator (SOI) structure, the planar optical isolator comprising:
    an input waveguiding region formed, at least in part, within the sub-micron thick surface silicon layer and defined as including an input port for coupling an input single mode optical signal into the input waveguiding region;
    an output waveguiding region formed, at least in part, within the sub-micron thick surface silicon layer and defined as including an output port for permitting a propagating single mode optical signal to exit the planar optical isolator; and
    a non-reciprocal, highly directional optical coupling regions disposed between the input and output waveguiding regions from transmitting a forward-directed, transmitted single mode optical signal from the input waveguiding region to the output waveguiding region and dissipating a rearward-directed, reflected optical signal such that only a relatively small portion of the reflected signal is coupled into the input waveguiding regions, thus providing a substantial degree of optical isolation for signals propagating in the reverse direction, wherein the non-reciprocal, highly directional optical coupling region comprises an N-way optical waveguide splitter/combiner including:
        a plurality of N input waveguiding sections and a single output waveguiding section, with a single one of the N input waveguiding sections coupled to the isolator input waveguiding region, the remaining N−1 input waveguiding sections defined as isolating waveguiding sections, and the output waveguiding section coupled to the isolator output waveguiding region; and
        a plurality of N−1 optical isolating elements, each optical isolating element disposed along a portion of an associated one of the N−1 isolating waveguiding sections such that a rearward-directed, reflected optical signal is coupled into each one of the plurality of N input waveguiding sections and is dissipated along the plurality of N−1 isolating waveguiding sections by its associated optical isolating element such that only a relatively small portion propagating along the input optical waveguiding region remains, wherein each isolating element comprises an optically radiative element formed within its associated isolating waveguiding region, the optically radiative element comprising a waveguide-based diffraction grating structure wherein the properties of the diffraction grating structure are configured to introduce an adiabatic change in effective index between the isolating waveguiding section and its associated isolating element.

2. The planar optical isolator as defined in claim 1 wherein the optically radiative element comprises an outwardly tapered waveguide structure.

3. The planar optical isolator as defined in claim 1 wherein the optically radiative element comprises an inwardly tapered waveguide structure.

4. The planar optical isolator as defined in claim 1 wherein each isolating element comprises an optically absorbing element formed within its associated isolating waveguiding region.

5. The planar optical isolator as defined in claim 4 wherein the optically absorbing element includes a tapered input region configured to introduce an adiabatic change in effective index between the isolating waveguiding region and the associated isolating element.

6. The planar optical isolator as defined in claim 4 wherein the optically absorbing element is selected from the group consisting of: a metal, a silicide, germanium and SiGe.

7. The planar optical isolator as defined in claim 4 wherein the optically absorbing element generates an electric current and functions as a photodetector to measure the absorbed optical signal.

8. The planar optical isolator as defined in claim 1 wherein each isolating element comprises a combination of an optically radiative element and an optically absorbing element.

9. The planar optical isolator as defined in claim 1 wherein the N-way optical waveguide splitter/combiner comprises a Y-geometry splitter/combiner having a pair of waveguiding regions, defined as the input waveguiding region and the isolating waveguiding section, the arms of the Y-geometry splitter/combiner having a predetermined angular displacement between the input waveguiding region and the isolating waveguiding section.

10. The planar optical isolator as defined in claim 9 wherein the predetermined angular displacement between the input waveguiding region and the isolating waveguiding section is no greater than 50°.

11. The planar optical isolator as defined in claim 9 wherein the optical waveguide coupling region provides an essentially symmetric 50:50 split in reflected signals between the input waveguiding region and the isolating waveguiding section.

12. The planar optical isolator as defined in claim 9 wherein the optical waveguide coupling region provides an asymmetric split in reflected signals between the input waveguiding region and the isolating waveguiding section.

13. The planar optical isolator as defined in claim 12 wherein the optical waveguide coupling region provides an essentially 10:90 split in reflected signals between the input waveguiding region and the isolating waveguiding section.

14. The planar optical isolator as defined in claim 12 wherein the optical waveguide coupling region provides an essentially 20:80 split in reflected signals between the input waveguiding region and the isolating waveguiding section.

15. The planar optical isolator as defined in claim 1 wherein the N-way optical waveguide splitter/combiner comprises a 3-way splitter/combiner having a single input optical waveguiding region and a pair of isolating waveguiding sections, with one isolating waveguiding section disposed on either side of the input waveguiding region.

16. The planar optical isolator as defined in claim 1 wherein the sub-micron thick surface silicon layer of the SOI structure comprises a strained silicon layer.

17. The planar optical isolator as defined in claim 1 wherein the optical isolator further comprises a patterned polysilicon layer disposed over predetermined portions of the non-reciprocal, highly directional optical coupling region so as to modify the mode of the propagating reflected optical signal such that a larger portion of the reflected optical signal is directed away from the input waveguiding region.

18. The planar optical isolator as defined in claim 1 wherein the N-way optical waveguide splitter/combiner comprises an optical waveguiding expansion region disposed between the input waveguiding region and the output waveguiding region, the optical waveguiding expansion region including a tapered transition section coupled to the output waveguiding region and an enlarged section coupled to the input waveguiding region, the combination of the tapered transition section and enlarged section such that a forward-directed transmitted signal is coupled from the input waveguiding region into the enlarged section and thereafter propagates through the tapered transition region, in an inwardly tapered direction, so as to be coupled into the output waveguiding region, and a rearward-directed, reflected signal is coupled from the output waveguiding region into the tapered transition section, in an outwardly tapered direction and thereafter propagates through the enlarged section so as to further increase in mode size such that only a relatively small portion of the reflected signal is coupled into the input waveguiding region.

19. The planar optical isolator as defined in claim 18 wherein the optical waveguiding expansion region is formed so as to be substantially symmetric about the propagation direction of an optical signal.

20. The planar optical isolator as defined in claim 18 wherein the isolator further comprises a patterned polysilicon layer disposed over the optical waveguiding expansion region so as to increase the amount of reflected optical signal directed out of the signal path associated with the input waveguiding region.

21. The planar optical isolator as defined in claim 18 wherein the isolator further comprises an isolating element disposed over a portion of the optical waveguiding expansion region so as to dissipate the reflected optical signal.

22. The planar optical isolator as defined in claim 21 wherein the isolating element comprises an optically absorbing element.

23. The planar optical isolator as defined in claim 21 wherein the isolating element comprises an optically radiative element.

* * * * *